United States Patent [19]

McCumber

[11] 4,163,568
[45] Aug. 7, 1979

[54] PIVOTABLE TRAILER HITCH

[76] Inventor: Donald D. McCumber, Owl Creek Rte., Thermopolis, Wyo. 82443

[21] Appl. No.: 924,740

[22] Filed: Jul. 14, 1978

[51] Int. Cl.$^2$ ............................................. B60D 1/16
[52] U.S. Cl. ................................................. 280/491 B
[58] Field of Search ........... 280/491 R, 491 A, 491 B, 280/491 D

[56] References Cited

U.S. PATENT DOCUMENTS

| 2,733,936 | 2/1956 | Tate | 280/491 B |
|---|---|---|---|
| 2,804,316 | 8/1957 | Derksen | 280/491 A |
| 2,818,277 | 12/1957 | McElhoe | 280/491 R |
| 2,823,930 | 2/1958 | Cooper | 280/491 B |
| 2,849,243 | 8/1958 | Halverson | 280/491 B |
| 3,565,461 | 2/1971 | Jones | 280/491 B |
| 3,640,550 | 2/1972 | Pearson | 280/491 B |
| 3,751,072 | 8/1973 | Williams | 280/491 B |

Primary Examiner—Joseph F. Peters, Jr.
Assistant Examiner—R. Schrecengost
Attorney, Agent, or Firm—Daniel Jay Tick

[57] ABSTRACT

A hitch member for an automotive vehicle is affixed to a mounting bar which is rotatably mounted in the side beams of the frame of the vehicle and is rotatable with such mounting bar. A brace member is pivotally mounted on a cross member affixed to the side beams of the frame and is movable and releasably affixable to the hitch member to secure said hitch member in operable position and in retracted position when the hitch member is not in use.

1 Claim, 3 Drawing Figures

PIVOTABLE TRAILER HITCH

BACKGROUND OF THE INVENTION

The present invention relates to a pivotable trailer hitch. More particularly, the invention relates to a pivotable trailer hitch for an automotive vehicle having a frame with a pair of spaced parallel side beams extending along the length of the vehicle, the frame having front and rear ends, and a rear bumper affixed to the side beams at the rear ends thereof and extending perpendicularly thereof.

Pivotable trailer hitches are disclosed in U.S. Pat. Nos. 2,733,936; 2,804,316; 2,823,930; 2,849,243; 3,640,550 and 3,751,072.

Objects of the invention are to provide a pivotable trailer hitch of simple structure, which is inexpensive in manufacture, installed with facility and convenience, used with facility, convenience and safety, and functions efficiently, effectively and reliably as a trailer hitch in operable position and is stored in retracted position in a manner which protects it from damage and eliminates clearance problems existing with known types of hitches.

BRIEF DESCRIPTION OF THE DRAWINGS

In order that the invention may be readily carried into effect, it will now be described with reference to the accompanying drawings, wherein.

DETAILED DESCRIPTION OF THE INVENTION

Figure 1:
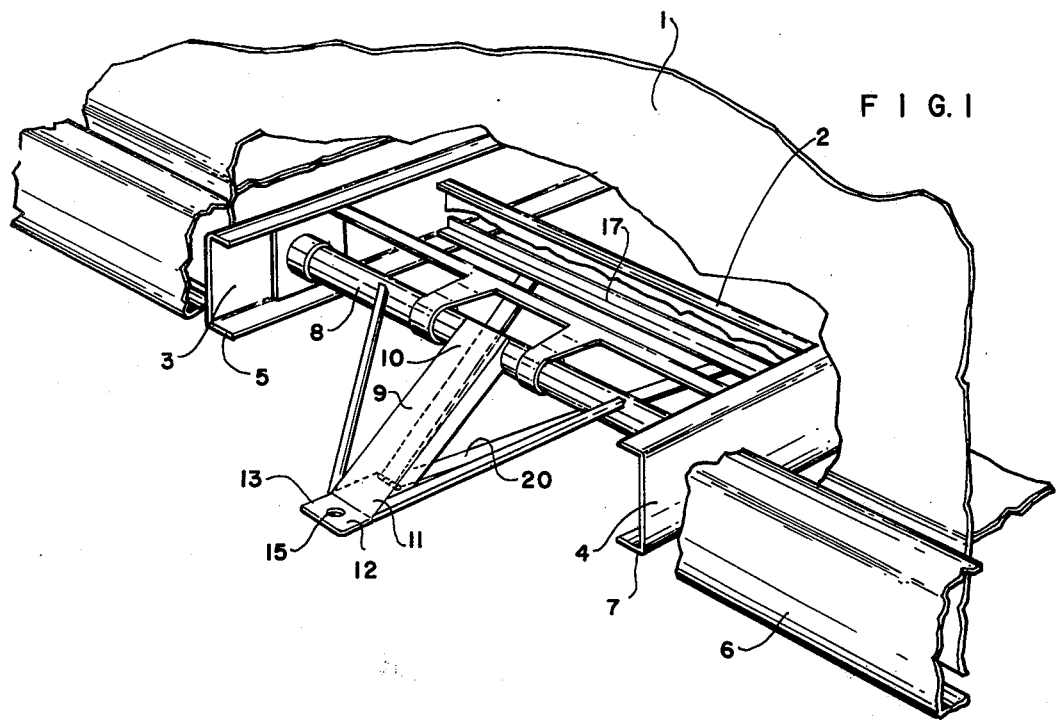
FIG. 1 is a perspective view of an embodiment of the pivotable trailer hitch of the invention.

The pivotable trailer hitch of the invention is for an automotive vehicle 1 (FIG. 1) having a frame 2 with a pair of spaced parallel side beams 3 and 4 extending along the length of the vehicle (FIG. 1). The frame 2 has a front end (not shown in the FIGS.) and a rear end 5 (FIG. 1). A rear bumper 6 is affixed to the side beams 3 and 4 at the rear ends 5 and 7 thereof, respectively, as shown in FIG. 1, and extends perpendicularly to said side beams.

The pivotable trailer hitch of the invention comprises a mounting bar 8 rotatably affixed to the side beams 3 and 4 of the frame 2 in the area of the rear ends 5 and 7 thereof and extending perpendicularly to said side beams.

A hitch member 9 has spaced opposite first and second ends 10 and 11, respectively. The first end 10 of the hitch member 9 is affixed to the mounting bar 8 and rotatable therewith. A hitch plate 12 extends angularly with the hitch member 9 at the second end 11 of said hitch member. The hitch plate 12 has first and second ends 13 and 14, respectively. A hitch pin hole 15 is formed through the hitch plate 12 at the first end 13 thereof, as shown in FIG. 1. A pin hole 16 is formed through the hitch plate 12 at the second end 14 thereof, as shown in FIGS. 2 and 3.

Figure 2:
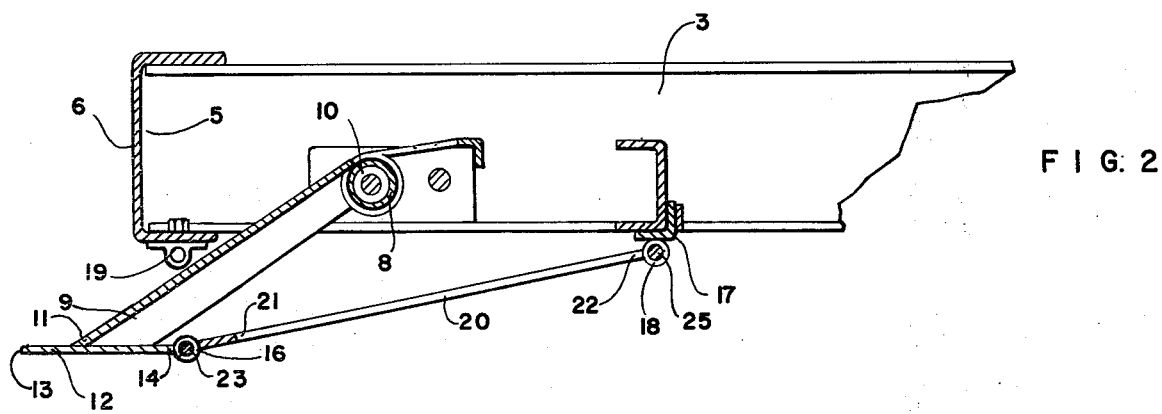
FIG. 2 is a side view, on an enlarged scale, partly in section, of the embodiment of FIG. 1, with the hitch member in operable position.
Figure 3:
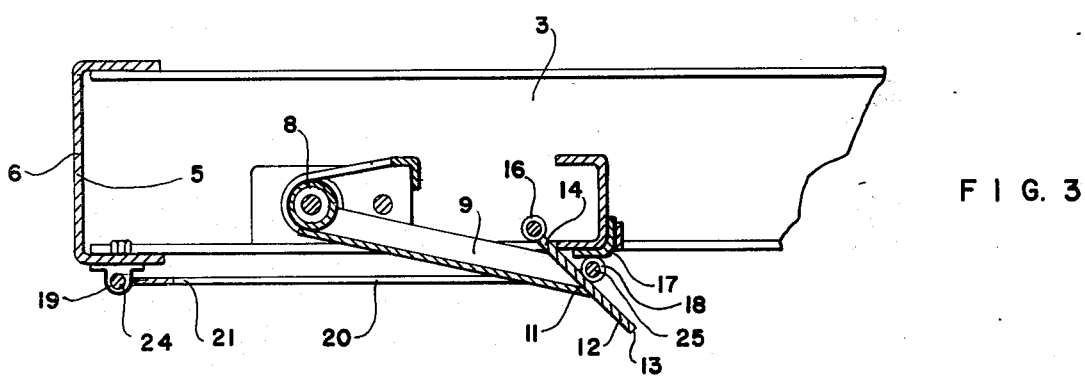
FIG. 3 is a side view, on an enlarged scale, partly in section, with the hitch member in retracted position.

A cross member 17 is affixed to the side beams 3 and 4 of the frame 2 in spaced parallel relation with the mounting bar 8, closer to the front end of the frame than the rear end 5 of said frame, as shown in the FIGS. A cross member pin hole 18 is provided on the cross member 17, as shown in FIGS. 2 and 3.

A bumper pin hole member 19 is provided on the rear bumper 6, as shown in FIGS. 2 and 3.

A brace member 20 has spaced opposite first and second ends 21 and 22 (FIG. 2). The first and second ends 21 and 22 of the brace member 20 have first and second pin hole members thereat, which pin hole members are not shown in the views of the FIGS. The first end 21 of the brace member 20 is pivotally affixable to the pin hole 16 of the hitch plate 12 via a pin 23, shown in section in FIG. 2, to secure the hitch member 9 in operable position, shown in FIGS. 1 and 2, with its hitch plate substantially parallel to the plane of the side beams 3 and 4 of the frame 2 and below said frame and extending rearward of the rear bumper 6, as shown in FIGS. 1 and 2.

The hitch member 9 is releasable from the brace member 20 and is rotatable with the mounting bar 8 to a retracted position, as shown in FIG. 3, in which the hitch plate 12 abuts the cross member 17. The first end 21 of the brace member 20 is then pivotally affixable to the bumper pin hole member 19, in the manner shown in FIG. 3, via a pin 24, shown in cross section in FIG. 3, whereby the brace member supports the hitch member in the retracted position of said hitch member. The second end 22 of the brace member 20 is pivotally affixable to the cross member pin hole member 18, as shown in FIGS. 2 and 3, via a pin 25, shown in cross section in FIGS. 2 and 3.

The trailer hitch of the invention is especially advantageous when utilized with four wheel drive vehicles of high road clearance, so that the hitch member will not create any problems due to road clearance when it is in its retracted position. The bracing of the hitch member prevents buckling failure thereof. The mounting bar 8 may be rotatably mounted by any suitable means such as, for example, mounting ferrules, and the like.

While the invention has been described by means of a specific example and in a specific embodiment, I do not wish to be limited thereto, for obvious modifications will occur to those skilled in the art without departing from the spirit and scope of the invention.

I claim:

1. A pivotable trailer hitch for an automotive vehicle having a frame with a pair of spaced parallel side beams extending along the length of the vehicle, said frame having front and rear ends, and a rear bumper affixed to the side beams at the rear ends thereof and extending perpendicularly thereto, said pivotable trailer hitch comprising a mounting bar rotatably affixed to the side beams of the frame in the area of the rear ends thereof and extending perpendicularly therebetween;

a hitch member having spaced opposite first and second ends, the first end of said hitch member being affixed to said mounting bar and rotatable therewith and a hitch plate extending angularly with said hitch member at the second end thereof, said hitch plate having spaced opposite first and second ends with a hitch pin hole formed therethrough at the first end thereof and a pin hole formed therein at the second end thereof;

a cross member affixed to the side beams of the frame in spaced parallel relation with said mounting bar closer to the front end of said frame than the rear end thereof;

a cross member pin hole member in said cross member;
a bumper pin hole member on said rear bumper; and
a brace member having spaced opposite first and second ends having first and second pin hole members thereat, respectively, the second end of said brace member being pivotally affixed to the cross member pin hole member via a pin, the first end of said brace member being pivotally affixable to the pin hole of said hitch plate via a pin to secure said hitch member in operable position with its hitch plate substantially parallel to the plane of the side beams of the frame and below said frame and extending rearward of the rear bumper, said hitch member being releasable from said brace member and rotatable with said mounting bar to a retracted position in which said hitch plate abuts said cross member, and the first end of said brace member being pivotally affixable to the bumper pin hole member via a pin whereby said brace member supports said hitch member in the retracted position of said hitch member.